US012617877B2

(12) United States Patent
Cha et al.

(10) Patent No.: US 12,617,877 B2
(45) Date of Patent: May 5, 2026

(54) METALLOCENE SUPPORTED CATALYST AND METHOD FOR PREPARING OLEFINE POLYMER USING THE SAME

(71) Applicant: LG CHEM, LTD., Seoul (KR)

(72) Inventors: Jinmyung Cha, Daejeon (KR); Daesik Hong, Daejeon (KR); Sangeun An, Daejeon (KR); Seok Hwan Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 828 days.

(21) Appl. No.: 17/773,029

(22) PCT Filed: Sep. 29, 2021

(86) PCT No.: PCT/KR2021/013338
§ 371 (c)(1),
(2) Date: Apr. 28, 2022

(87) PCT Pub. No.: WO2022/080713
PCT Pub. Date: Apr. 21, 2022

(65) Prior Publication Data

US 2022/0403062 A1 Dec. 22, 2022

(30) Foreign Application Priority Data

Oct. 16, 2020 (KR) ........................ 10-2020-0134651
Sep. 28, 2021 (KR) ........................ 10-2021-0128298

(51) Int. Cl.
*C08F 4/76* (2006.01)
*C08F 4/02* (2006.01)
*C08F 10/06* (2006.01)

(52) U.S. Cl.
CPC .................. *C08F 4/76* (2013.01); *C08F 4/02* (2013.01); *C08F 10/06* (2013.01); *C08F 2410/06* (2021.01); *C08F 2420/08* (2021.01)

(58) Field of Classification Search
USPC .......................................................... 508/158
See application file for complete search history.

(56) References Cited

U.S. PATENT DOCUMENTS

| | | | |
|---|---|---|---|
| 5,688,734 | A | 11/1997 | Speca et al. |
| 7,381,780 | B2 | 6/2008 | Apecetche et al. |
| 2003/0054952 | A1 | 3/2003 | Takahashi |
| 2006/0120941 | A1 | 6/2006 | Chen et al. |
| 2007/0265402 | A1 | 11/2007 | Apecetche et al. |

(Continued)

FOREIGN PATENT DOCUMENTS

| | | | |
|---|---|---|---|
| CN | 1781997 | A | 6/2006 |
| DE | 10211433 | A1 | 10/2003 |

(Continued)

OTHER PUBLICATIONS

DE10211433A1—English translation—2003 (Year: 2003).*

(Continued)

*Primary Examiner* — Christina A Johnson
(74) *Attorney, Agent, or Firm* — Morgan, Lewis & Bockius LLP

(57) ABSTRACT

Provided are a metallocene supported catalyst capable of greatly reducing generation of fine powder during preparation of olefin polymers while exhibiting excellent catalyst activity, and a method of preparing olefin polymers using the same.

13 Claims, 2 Drawing Sheets

(56) References Cited

U.S. PATENT DOCUMENTS

| | | | | |
|---|---|---|---|---|
| 2012/0071614 A1 | 3/2012 | Schmidt et al. | | |
| 2015/0344667 A1* | 12/2015 | Rao | C08K 3/36 524/847 | |
| 2019/0078015 A1* | 3/2019 | Southwell | C09K 8/588 | |

FOREIGN PATENT DOCUMENTS

| | | | |
|---|---|---|---|
| KR | 10-2000-0023611 | A | 4/2000 |
| KR | 10-2011-0110350 | A | 10/2011 |
| KR | 10-2012-0004477 | A | 1/2012 |
| KR | 10-2015-0018467 | A | 2/2015 |
| KR | 10-2015-0136282 | A | 12/2015 |
| KR | 10-2017-0114056 | A | 10/2017 |
| KR | 10-2018-0051222 | A | 5/2018 |
| KR | 10-1925430 | B1 | 2/2019 |
| KR | 10-2020-0058047 | A | 5/2020 |
| KR | 10-2020-0059607 | A | 5/2020 |
| WO | 97/02297 | A1 | 1/1997 |
| WO | 98/02246 | A1 | 1/1998 |
| WO | 2014/106143 | A1 | 7/2014 |

OTHER PUBLICATIONS

Silveira, et.al., ("Effect of the silica texture on grafting metallocene catalysts", Journal of Molecular Catalysis A: Chemical 265 (2007) 167-176) (Year: 2007).*

Moreno, et.al. ("Correlating the Morphological Properties and Structural Organization of Monodisperse Spherical Silica Nanoparticles Grown on a Commercial Silica Surface", ChemPhysChem 2015, 16, 2981-2994 (Year: 2007).*

International Search Report (with partial translation) and Written Opinion dated Jan. 10, 2022, for corresponding International Patent Application No. PCT/KR2021/013338.

Extended European Search Report issued from the European Patent Office dated Dec. 6, 2022 in connection with corresponding European Patent Application No. 21878747.1.

Von Hohenesche et al., "Agglomerated non-porous silica nanoparticles as model carriers in polyethylene synthesis," Journal of Molecular Catalysis A: Chemical, Elsevier, vol. 221, No. 1-2, 2004, pp. 185-199.

* cited by examiner

【FIG. 1】
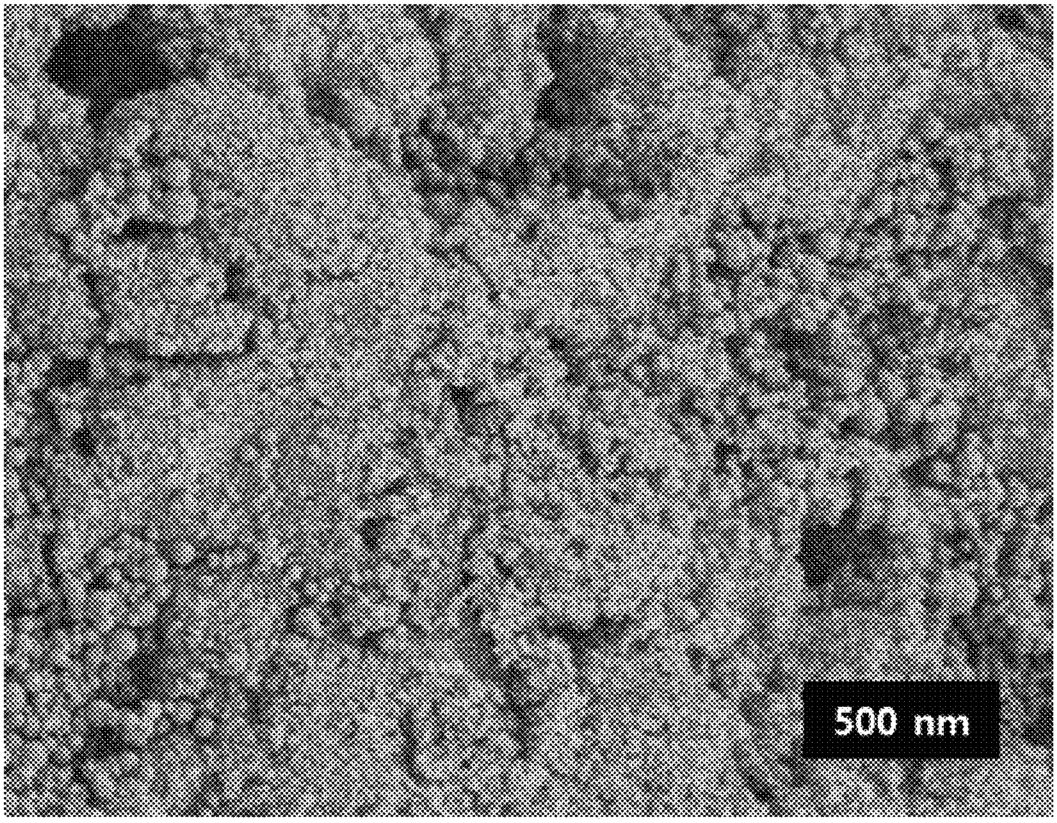

【FIG. 2】
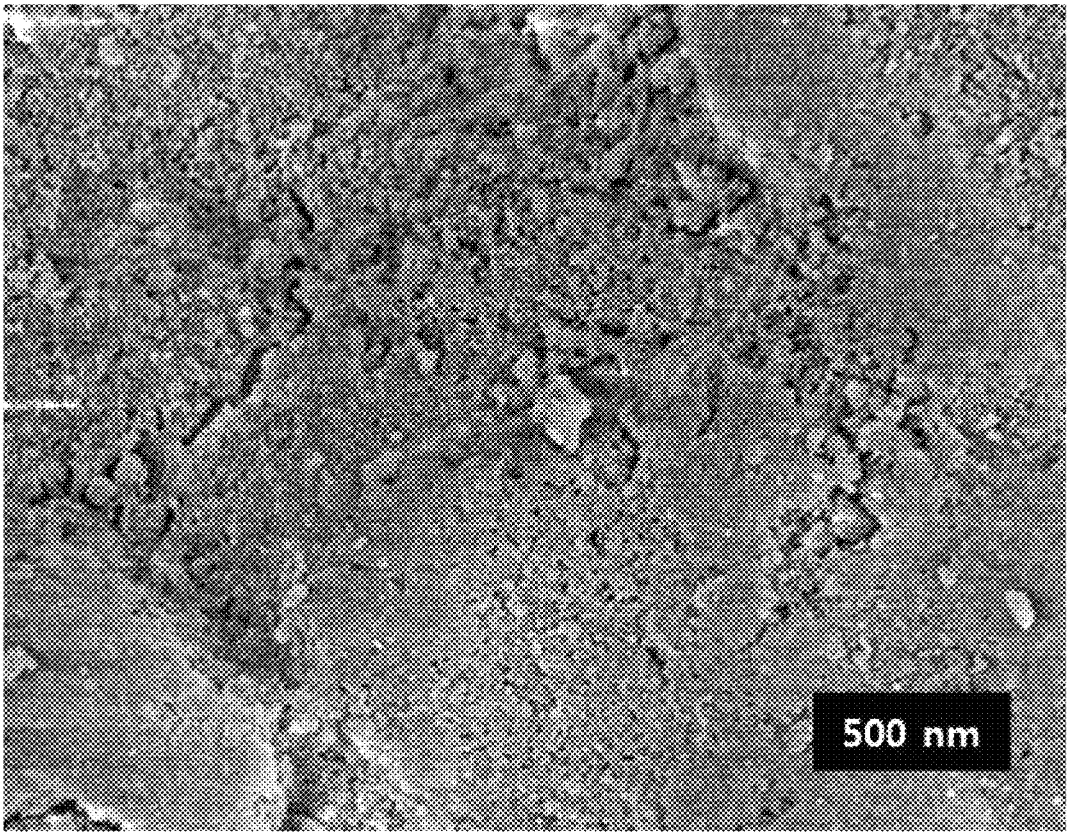

METALLOCENE SUPPORTED CATALYST AND METHOD FOR PREPARING OLEFINE POLYMER USING THE SAME

CROSS-REFERENCE TO RELATED APPLICATION(S)

The present application is based on, and claims priority from, Korean Patent Application Nos. 10-2020-0134651 and 10-2021-0128298, filed on Oct. 16, 2020 and Sep. 28, 2021, respectively, the disclosures of which are hereby incorporated by reference herein in their entirety.

TECHNICAL FIELD

The present invention relates to a metallocene supported catalyst and a method of preparing an olefin polymer using the same.

BACKGROUND ART

Silica is mainly used as a support for a metallocene supported catalyst. To increase its catalytic activity, a metallocene as a main catalyst and a cocatalyst are supported by increasing the loading amounts thereof. However, as the loading amounts of the main catalyst and the cocatalyst increase, a large amount of the catalyst is exposed on the surface of the silica support, and thus catalyst leaching easily occurs, and the catalyst not tightly bound to the support is also leached through pores of the support. The leached catalyst forms fine powder to cause fouling in a reactor during a polymerization reaction of an olefin polymer. In particular, static electricity is generated during high-speed movement of powder, and fine powder has a relatively high surface area, and therefore, fine powder is easily agglomerated by static electricity to further increase reactor fouling.

Accordingly, in order to prevent reactor fouling, a method of reducing the generation of fine powder by preventing the catalyst from leaching or by deactivating the leached catalyst, or a method of reducing the electrostatic properties of fine powder is required.

As a traditional method of reducing the electrostatic properties of fine powder, a method of using an anti-fouling agent during preparation of polymers has been suggested. The anti-fouling agent, which is a material having a molecular structure including a hydrophilic group and a hydrophobic group at the same time, suppresses static electricity generated during preparation of polymers, thereby reducing reactor fouling. In addition, since the hydrophilic group of the anti-fouling agent generally includes a hydroxyl (—OH) structure, it may deactivate the catalyst present on the surface of the support or the leached catalyst.

However, since the anti-fouling agent also deactivates the catalyst present inside the support, there is a problem in that the catalytic activity is greatly reduced.

Accordingly, it is necessary to develop a method of preparing a metallocene supported catalyst capable of preventing the leaching phenomenon while improving catalytic activity.

DETAILED DESCRIPTION OF THE INVENTION

Technical Problem

There are provided a metallocene supported catalyst capable of greatly reducing generation of fine powder during preparation of an olefin polymer while exhibiting excellent catalytic activity, and a preparation method thereof.

There is also provided a method of preparing an olefin polymer, the method capable of preparing the olefin polymer having excellent physical properties by reducing generation of fine powder using the metallocene supported catalyst.

Technical Solution

According to the present invention, provided is a metallocene supported catalyst including a silica support including pores; a transition metal compound supported on the silica support; and nanosilica disposed on a surface of the silica support and has a mean particle size of 10 nm to 100 nm, wherein the mean particle size is determined by a particle size at a point where a number-based cumulative distribution of particles according to a particle size reaches 50% when a particle size distribution is measured by a laser diffraction analysis.

Further, according to the present invention, provided is a method of preparing the above-described metallocene supported catalyst, the method including the steps of supporting the transition metal compound on the silica support; and adding, to the transition metal compound-supported silica support, nanosilica having a mean particle size of 10 nm to 100 nm, the mean particle size is determined by a particle size at a point where a number-based cumulative distribution of particles according to a particle size reaches 50% when a particle size distribution is measured by the laser diffraction analysis, followed by mixing with each other to support the nanosilica on the silica support.

Further, according to the present invention, provided is a method of preparing an olefinic polymer, the method including the step of polymerizing olefin monomers in presence of the above-described metallocene supported catalyst.

Advantageous Effects

A metallocene supported catalyst according to the present invention may greatly reduce generation of fine powder while exhibiting excellent catalytic activity during preparation of an olefin polymer. As a result, it is possible to prevent reactor fouling caused by fine powder, and also to prevent a problem of a reduction in the classifying efficiency due to adhesion of fine powder particles to a classifier by static electricity, or a problem of airborne fine powder in the work environment, etc.

BRIEF DESCRIPTION OF DRAWINGS

FIG. 1 shows an image of a metallocene supported catalyst prepared in Example 1-1, which was observed by a scanning electron microscope (SEM); and FIG. 2 shows an image of a metallocene supported catalyst prepared in Comparative Example 1-1, which was observed by SEM.

DETAILED DESCRIPTION OF THE EMBODIMENTS

The terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, steps, components, or combinations thereof, and do not exclude the existence or the possibility of addition of one or more different characteristics, steps, components or combinations thereof beforehand.

The present invention may be variously modified and have various forms, and specific exemplary examples will be illustrated and explained in detail below. However, it is not intended to limit the present invention to the specific exemplary examples and it must be understood that the present invention includes every modifications, equivalents, or replacements included in the spirit and technical scope of the present invention.

Hereinafter, a metallocene supported catalyst and a preparation method thereof, and a method of preparing an olefin polymer using the same according to specific embodiments of the present invention will be described.

During traditional preparation of a metallocene supported catalyst, when amounts of a catalyst and a cocatalyst are increased in order to increase the catalytic activity, fouling occurs in a reactor due to an increase in the leaching amount of the catalyst. In order to solve this fouling, when an anti-fouling agent is used, fouling occurrence in the reactor is inhibited, but there has been a problem in that the catalytic activity is deteriorated due to the anti-fouling agent.

In the present invention, accordingly, nanosilica is used during preparation of the metallocene supported catalyst to close pores of the support, thereby physically preventing the catalyst from leaching, and to selectively deactivate the catalyst, which is present on the surface of the support or leached out from the support, using Si—OH of the nanosilica, thereby maintaining high catalytic activity while suppressing generation of fine powder, leading to prevention of reactor fouling.

In particular, a highly active transition metal compound, or a transition metal compound including no tether group, specifically, a transition metal compound represented by Chemical Formula 1 explained below exhibits high activity during polymerization of an olefin polymer, particularly, polypropylene, but there has been a problem in that relatively more catalyst leaching occurs due to the absence of a tether group in the compound, as compared with other transition metal compounds having a tether group. In contrast, the metallocene supported catalyst according to the present invention includes nanosilica, and therefore, it may exhibit remarkably reduced catalyst leaching and excellent catalytic activity.

Specifically, the metallocene supported catalyst according to the present invention includes a silica support including pores;

a transition metal compound supported on the silica support; and nanosilica disposed on a surface of the silica support and has a mean particle size (D50) of 10 nm to 100 nm, wherein the mean particle size is determined by a particle size at a point where a number-based cumulative distribution of particles according to a particle size reaches 50% when a particle size distribution is measured by a laser diffraction analysis.

The silica support commonly used in the metallocene supported catalyst includes pores of 1 nm to 30 nm, and the metallocene catalyst is located within the pores. In the present invention, nanosilica having a larger particle size than the pores present in the silica support, specifically, a mean particle size (D50) of 10 nm to 100 nm is used, and thus it is possible to physically prevent the metallocene catalyst located within the pores from leaching out of the pores while maintaining the activity of the catalyst material in the support.

Specifically, the nanosilica does not penetrate into the pores of the silica support and is located on the surface of the silica support, and may prevent generation of fine powder by selectively deactivating the metallocene catalyst supported on the surface of the silica support. In addition, the nanosilica closes the open pores of the silica support to physically prevent the metallocene catalyst located within the pores from leaching out of the pores.

When the nanosilica is too small by having a mean particle size (D50) of less than 10 nm, to preparation is not easy, and it may penetrate into the pores of the support to deactivate the catalyst material. When the mean particle size (D50) of the nanosilica is more than 100 nm, the effect of deactivating the catalyst material which may cause fouling on the surface of or outside the support may be deteriorated. More specifically, the nanosilica may have a mean particle size (D50) of 10 nm or more, or 20 nm or more, or 30 nm or more, or 40 nm or more, or 50 nm or more, or 60 nm or more, and 100 nm or less, or 70 nm or less.

Meanwhile, in the present invention, the mean particle size (D50) of the nanosilica refers to a particle size at the point where the number-based cumulative distribution of particles according to the particle size reaches 50% when the particle size distribution of the nanosilica is analyzed, and it may be measured using a laser diffraction method. In detail, the nanosilica particles are dispersed in a dispersion medium, and then introduced into a laser diffraction particle size analyzer, for example, Zetasizer Nano ZS manufactured by Marvern. When nanosilica particles pass through a laser beam, a diffraction pattern difference according to the particle size is measured to obtain the particle size distribution, and the particle size at the point where the number-based cumulative distribution of particles according to the particle size reaches 50% in the analyzer is obtained and expressed as the mean particle size (D50).

Further, the nanosilica may be included in an amount of 1 part by weight to 10 parts by weight with respect to 100 parts by weight of the silica support catalyst. When the content of the nanosilica is less than 1 part by weight, the improvement effect by including the nanosilica is not satisfactory, and when the content is more than 10 parts by weight, the catalytic activity may be rather reduced due to a decrease in the supporting amount of the metallocene catalyst with respect to the total weight of the metallocene supported catalyst. More specifically, the nanosilica may be included in an amount of 1 part by weight or more, or 3 parts by weight or more, or 5 parts by weight or more, or 6 parts by weight or more, and 10 parts by weight or less, or 8 parts by weight or less.

Meanwhile, in the metallocene supported catalyst according to one embodiment of the present invention, porous silica may be used as a silica support.

Specifically, the silica support may have a mean particle size (D50) of 10 μm to 50 μm, and a BET specific surface area of 100 $m^2/g$ to 500 $m^2/g$. As described, when the silica support has a large specific surface area relative to the particle size, it may support larger amounts of the metallocene catalyst and the nanosilica, and as a result, the catalytic activity may be increased.

More specifically, the silica support may have a mean particle size (D50) of 10 μm or more, or 20 μm or more, or 30 μm or more, or 35 μm or more, and 50 μm or less, or 45 μm or less, or 40 μm or less, and a BET specific surface area of 100 $m^2/g$ or more, or 200 $m^2/g$ or more, or 250 $m^2/g$ or more, or 270 $m^2/g$ or more, or 290 $m^2/g$ or more, and 500 $m^2/g$ or less, or 450 $m^2/g$ or less, or 400 $m^2/g$ or less, or 350 $m^2/g$ or less, or 300 $m^2/g$ or less.

In the present invention, the mean particle size (D50) of the silica support refers to a particle size at a point where a volume-based cumulative distribution of particles according to a particle size reaches 50% when a particle size distribution of the silica support is analyzed, and it may be measured using a laser diffraction method. In detail, in the same manner as in measuring the mean particle size (D50) of the nanosilica, the silica support powder is dispersed in a dispersion medium, and then introduced into a laser diffraction particle size analyzer, for example, Microtrac 53500 manufactured by Microtrac. When the silica support particles pass through a laser beam, a diffraction pattern difference according to the particle size is measured to obtain the particle size distribution, and the particle size at the point where the volume-based cumulative distribution of particles according to the particle size reaches 50% in the analyzer is obtained and expressed as the mean particle size (D50).

Further, the BET specific surface area of the silica support is a Brunauer-Emmett-Teller specific surface area (SBET) measured according to a Brunauer-Emmett-Teller (BET) method, and may be specifically measured through a nitrogen gas adsorption/desorption analysis at 77 K using a specific surface area analyzer (BEL Japan Inc., BELSORP-max).

Further, in terms of achieving and enhancing the effects of the present invention, it is preferable that the silica support includes pores having a smaller size than the particle size of the nanosilica. Specifically, the silica support may have a mean pore size of 1 nm to 30 nm, and more specifically, a mean pore size of 1 nm or more, or 5 nm or more, or 10 nm or more, or 15 nm or more, or 16 nm or more, and 30 nm or less, or 25 nm or less, or 20 nm or less, or 18 nm or less.

Meanwhile, in the present invention, the mean pore size of the silica support may be measured by obtaining a nitrogen gas adsorption/desorption isotherm at 77 K using a specific surface area analyzer (BEL Japan Inc., BELSORP-max), and then by plotting the isotherm according to BJH (Barrett-Joyner-Halenda).

Meanwhile, in the metallocene supported catalyst according to one embodiment of the present invention, a transition metal compound represented by the following Chemical Formula 1 may be specifically used as the metallocene catalyst:

[Chemical Formula 1]

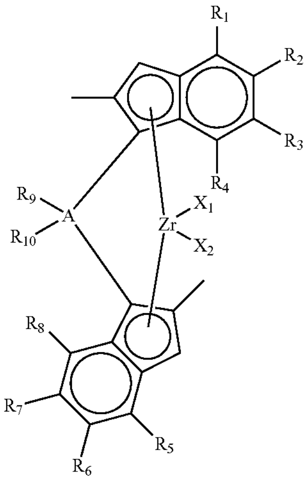

in Chemical Formula 1,

A is carbon, silicon, or germanium, $X_1$ and $X_2$ are each independently halogen, $R_1$ and $R_5$ are each independently $C_{6-20}$ aryl unsubstituted or substituted with $C_{1-20}$ alkyl, $R_2$ to $R_4$ and $R_6$ to $R_8$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl, and $R_9$ and $R_{10}$ are, the same as each other, $C_{2-20}$ alkyl.

Unless otherwise specified herein, the following terms may be defined as follows.

The halogen may be fluorine (F), chlorine (Cl), bromine (Br), or iodine (I).

The $C_{1-20}$ alkyl group may be a linear, branched, or cyclic alkyl group. Specifically, the $C_{1-20}$ alkyl group may be a $C_{1-15}$ linear alkyl group; a $C_{1-10}$ linear alkyl group; a $C_{1-5}$ linear alkyl group; a $C_{3-20}$ branched or cyclic alkyl group; a $C_{3-15}$ branched or cyclic alkyl group; or a $C_{3-10}$ branched or cyclic alkyl group. More specifically, the $C_{1-20}$ alkyl group may be a methyl group, an ethyl group, an n-propyl group, an iso-propyl group, an n-butyl group, an iso-butyl group, a tert-butyl group, an n-pentyl group, an iso-pentyl group, a neo-pentyl group, a cyclohexyl group, etc.

The $C_{2-20}$ alkenyl group may be a linear, branched, or cyclic alkenyl group. Specifically, the $C_{2-20}$ alkenyl group may be a $C_{2-20}$ linear alkenyl group, a $C_{2-10}$ linear alkenyl group, a $C_{2-5}$ linear alkenyl group, a $C_{3-20}$ branched alkenyl group, a $C_{3-15}$ branched alkenyl group, a $C_{3-10}$ branched alkenyl group, a $C_{5-20}$ cyclic alkenyl group, or a $C_{5-10}$ cyclic alkenyl group. More specifically, the $C_{2-20}$ alkenyl group may be an ethenyl group, a propenyl group, a butenyl group, a pentenyl group, a cyclohexenyl group, etc.

The $C_{6-30}$ aryl group may refer to a monocyclic, bicyclic, or tricyclic aromatic hydrocarbon. Specifically, the $C_{6-30}$ aryl group may be a phenyl group, a naphthyl group, an anthracenyl group, etc.

The $C_{7-30}$ alkylaryl group may refer to a substituent formed by substituting one or more hydrogens of aryl with alkyl. Specifically, the $C_{7-30}$ alkylaryl group may be methylphenyl, ethylphenyl, n-propylphenyl, iso-propylphenyl, n-butylphenyl, iso-butylphenyl, tert-butylphenyl, or cyclohexylphenyl, etc.

The $C_{7-30}$ arylalkyl group may refer to a substituent formed by substituting one or more hydrogens of alkyl with aryl. Specifically, the $C_{7-30}$ arylalkyl may be benzyl, phenylpropyl, phenylhexyl, etc.

The metallocene supported catalyst according to one embodiment of the present invention includes the compound of Chemical Formula 1 as a single catalyst. Accordingly, a molecular weight distribution of an olefin polymer to be prepared may become remarkably narrow, as compared with those prepared by using two or more kinds of catalysts in a mixture.

Further, both indenyl groups as ligands are substituted with a methyl group at the 2-position and include an aryl group unsubstituted or substituted with alkyl, respectively, at the 4-position ($R_1$ and $R_5$), thereby exhibiting better catalytic activity by an inductive effect to supply sufficient electrons.

In addition, the compound of Chemical Formula 1 includes zirconium (Zr) as a central metal, thereby having more orbitals to accept electrons, as compared with the case of including other Group 14 elements such as Hf, and therefore, the compound may be easily bound to a monomer with higher affinity, and as a result, may exhibit a better effect of improving catalytic activity.

More specifically, in Chemical Formula 1, $R_1$ and $R_5$ may be each independently a $C_{6-12}$ aryl group unsubstituted or substituted with $C_{1-10}$ alkyl. More specifically, $R_1$ and $R_5$ may be each independently a phenyl group or a naphthyl group, wherein the phenyl group or the naphthyl group may be unsubstituted or substituted with a $C_{3-6}$ branched alkyl group such as tert-butyl phenyl. Of them, when $R_1$ and $R_5$ are each independently a naphthyl group or a phenyl group substituted with an alkyl group, moreover, when the substitution position of the alkyl group to the phenyl group may be the 4-position corresponding to a para position with respect to $R_1$ or $R_5$ position bound to an indenyl group, excellent catalytic activity may be achieved.

Further, in Chemical Formula 1, $R_2$ to $R_4$, and $R_6$ to $R_8$ may be each independently hydrogen, and $X_1$ and $X_2$ may be each independently chloro.

Further, in Chemical Formula 1, A may be silicon (Si), and $R_9$ and $R_{10}$ as substituents of A are identical to each other in terms of improving supporting efficiency by increasing solubility, and may be a $C_{1-10}$ alkyl group, more specifically, a $C_{1-4}$ or $C_{2-4}$ linear alkyl group, and even more specifically, methyl or ethyl, respectively.

Of the above-described compounds of Chemical Formula 1, when the compound includes a divalent functional group A disubstituted with identical alkyl groups having 2 or more carbon atoms as a bridge group connecting two ligands including an indenyl group, an atomic size is increased, as compared with a compound where the substituent to the functional group A is a methyl group having one carbon atom, and approach to a monomer is easy, as the compound has an increased available angle, and solubility during preparation of the supported catalyst was excellent to exhibit excellent supporting reactivity. As a result, excellent catalytic activity may be achieved.

Representative examples of the compound represented by Chemical Formula 1 are as follows:

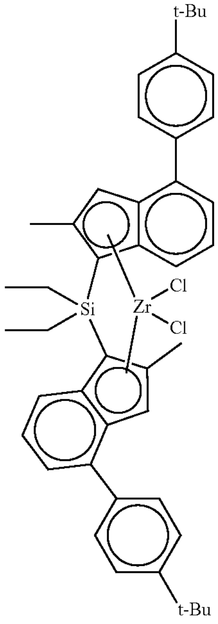

and

-continued

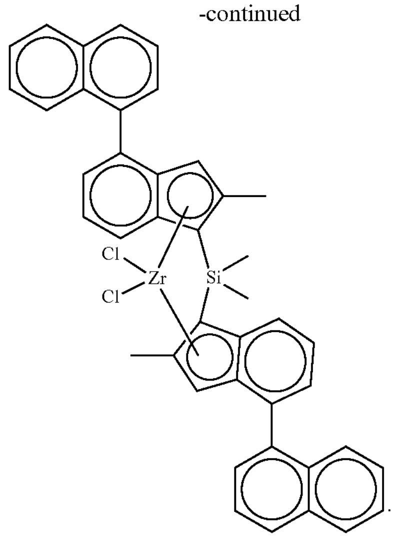

.

The compound of Chemical Formula 1 may be synthesized by applying known reactions, and for a more detailed synthesis method, reference may be made to Preparation Examples described later.

The metallocene supported catalyst according to one embodiment of the present invention may further include a cocatalyst in terms of enhancing catalytic activity and improving process stability.

Specifically, the cocatalyst may include a compound represented by the following Chemical Formula 2, Chemical Formula 3, or Chemical Formula 4, and any one thereof or a mixture of two or more thereof may be used:

$$—[Al(R_{11})—O]_m— \quad \text{[Chemical Formula 2]}$$

in Chemical Formula 2, $R_{11}$'s may be the same as or different from each other, and each independently halogen; $C_{1-20}$ hydrocarbon; or $C_{1-20}$ hydrocarbon substituted with halogen; and m is an integer of 2 or more;

$$J(R_{12})_3 \quad \text{[Chemical Formula 3]}$$

in Chemical Formula 3, $R_{12}$'s may be the same as or different from each other, and each independently halogen; $C_{1-20}$ hydrocarbon; or $C_{1-20}$ hydrocarbon substituted with halogen; and J is aluminum or boron;

$$[E-H]^+[ZQ_4]^- \text{ or } [E]^+[ZQ_4]^- \quad \text{[Chemical Formula 4]}$$

in Chemical Formula 4,

E is a neutral or cationic Lewis base;

H is a hydrogen atom;

Z is a Group 13 element; and

Q's may be the same as or different from each other, and each independently a $C_{6-20}$ aryl group or a $C_{1-20}$ alkyl group in which one or more hydrogen atoms are unsubstituted or substituted with halogen, $C_{1-20}$ hydrocarbon, alkoxy, or phenoxy.

Examples of the compound represented by Chemical Formula 2 may include methylaluminoxane, ethylaluminoxane, isobutylaluminoxane, butylaluminoxane, etc., and more specifically, methylaluminoxane.

Examples of the compound represented by Chemical Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc., and more specifically, may be selected from trimethylaluminum, triethylaluminum, and triisobutylaluminum.

In addition, examples of the compound represented by Chemical Formula 4 may include triethylammonium tetraphenylboron, tributylammonium tetraphenylboron, trimethylammonium tetraphenylboron, tripropylammonium tetraphenylboron, trimethylammonium tetra (p-tolyl) boron, trimethylammonium tetra (o,p-dimethylphenyl) boron, tributylammonium tetra (p-trifluoromethylphenyl) boron, trimethylammonium tetra (p-trifluoromethylphenyl) boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra (p-tolyl) aluminum, tripropylammonium tetra (p-tolyl) aluminum, triethylammonium tetra (o,p-dimethylphenyl) aluminum, tributylammonium tetra (p-trifluoromethylphenyl) aluminum, trimethylammonium tetra (p-trifluoromethylphenyl) aluminum, tributylammonium tetrapentafluorophenylaluminum, N,N-diethylanilinium tetraphenylaluminum, N,N-diethylanilinium tetrapentafluorophenylaluminum, triphenylphosphonium tetraphenylaluminum, trimethylphosphonium tetraphenylaluminum, tripropylammonium tetra (p-tolyl) boron, triethylammonium tetra (o,p-dimethylphenyl) boron, tributylammonium tetra (p-trifluoromethylphenyl) boron, triphenylcarbonium tetra (p-trifluoromethylphenyl) boron, triphenylcarbonium tetrapentafluorophenylboron, etc., and any one thereof or a mixture of two or more thereof may be used.

Among the above-described cocatalysts, the compound represented by Chemical Formula 2, more specifically, $C_{1-20}$ alkylaluminoxane-based compounds such as methylaluminoxane, etc. may be used as the cocatalyst, considering that it may exhibit better catalytic activity when used with the transition metal compound. The alkylaluminoxane-based compound acts as a scavenger of a hydroxyl group present on the surface of the support to improve the catalytic activity and to convert the halogen group of the catalyst precursor into a methyl group, thereby promoting chain growth during the polymerization of an olefin polymer.

The cocatalyst may be supported in an amount of 0.1 mmol or more, 5 mmol or more, 8 mmol or more, or 10 mmol or more, and 25 mmol or less, or 20 mmol or less, based on a weight of the support, for example, 1 g of the silica support. When supported within the above content range, it is possible to obtain the effect of improving catalytic activity due to use of the cocatalyst as well as the effect of reducing the generation of fine powder.

The metallocene supported catalyst having the above composition may be prepared by a preparation method including the steps of supporting a transition metal compound on a silica support (step 1); and adding, to the transition metal compound-supported silica support, nanosilica having a mean particle size of 10 nm to 100 nm, followed by mixing with each other to support the nanosilica on the silica support (step 2).

Hereinafter, each step will be described. The step 1 of preparing the metallocene supported catalyst according to one embodiment of the present invention is a step of supporting a transition metal compound on a silica support.

In this regard, the kind and content of the silica support and the transition metal compound are the same as described above.

The supporting of the transition metal compound on the silica support may be performed according to a common method. In detail, the silica support is dispersed in a hydrocarbon-based solvent such as toluene, etc., and then the transition metal compound is added to the resulting dispersion, and allowed to react at a temperature of 40° C. to 80° C. More specifically, reaction may be allowed by stirring at a temperature of 40° C. or higher, or 50° C. or higher, and 80° C. or lower, or 70° C. or lower for 3 hours or longer, or 5 hours or longer, and 7 hours or shorter.

The transition metal compound may be added in a solution phase. At this time, a hydrocarbon-based solvent, such as toluene, etc., may be used as the solvent. A concentration of the transition metal compound in the solution may be appropriately determined in consideration of a supporting amount of the transition metal compound on the supported catalyst, and reaction efficiency, etc.

Meanwhile, when the metallocene supported catalyst further includes a cocatalyst, a process of supporting the cocatalyst on the silica support may be performed before supporting the transition metal compound.

The process of supporting the cocatalyst may be performed by adding the cocatalyst to the silica support or the silica support-dispersed dispersion, and then by heating at a temperature of 70° C. to 100° C. More specifically, the process may be performed at a temperature of 70° C. or higher, or 80° C. or higher, and 100° C. or lower, or lower than 100° C., or 90° C. or lower. Further, the process of supporting the cocatalyst may be performed by allowing the reaction under stirring for 12 hours or longer, or 15 hours or longer, and 18 hours or shorter.

The cocatalyst may be added in a solution phase. At this time, a hydrocarbon-based solvent, such as toluene, etc., may be used as the solvent. A concentration of the cocatalyst in the solution may be appropriately determined in consideration of a supporting amount of the cocatalyst on the supported catalyst, and reaction time, etc.

Next, the step 2 is a step of supporting nanosilica on the silica support prepared in the step 1, on which the transition metal compound, and optionally, the cocatalyst are supported.

In detail, the silica support prepared in the step 1, on which the transition metal compound, and optionally, the cocatalyst are supported, is dispersed in an aliphatic hydrocarbon-based solvent such as hexane, etc., and then nanosilica is added thereto and allowed to react.

The nanosilica is added also in a dispersion state, in which the nanosilica is dispersed in an aliphatic hydrocarbon-based solvent such as hexane, etc. At this time, a concentration of the nanosilica in the dispersion may be appropriately determined in consideration of a supporting amount of the nanosilica on the metallocene supported catalyst, and reaction efficiency, etc.

The reaction may be performed at room temperature, specifically, 15° C. or higher, or 18° C. or higher, and 28° C. or lower, or 25° C. or lower, and at this time, a stirring process may be performed in order to increase reaction efficiency.

The metallocene supported catalyst prepared by the above-described preparation method includes the metallocene compound, and optionally, the cocatalyst, which are supported in the pores of the silica support, and also includes nanosilica on the surface of the silica support. Accordingly, it is possible to prevent the transition metal compound from leaching, and to selectively deactivate the transition metal compound with high possibility of leaching as it is located on the surface of the silica support by Si—OH of nanosilica, thereby suppressing generation of fine powder during preparation of olefinic polymers, and as a result, preventing reactor fouling. Therefore, it is also possible to improve physical properties of the polymer to be prepared.

Accordingly, according to still another embodiment of the present invention, provided is a method of preparing an olefinic polymer, the method including the step of polymerizing olefin monomers in presence of the above-described metallocene supported catalyst.

The above-described metallocene supported catalyst may be used in a slurry state or in a diluted state in a solvent, or in the form of a mud catalyst mixed with a mixture of oil and grease, depending on the polymerization method of the olefin polymer.

When used in a slurry state or in a diluted state in a solvent, the solvent may be an aliphatic hydrocarbon solvent having 5 to 12 carbon atoms such as pentane, hexane, heptane, nonane, decane, and an isomer thereof, an aromatic hydrocarbon solvent such as toluene and benzene, or a chlorine-substituted hydrocarbon solvent such as dichloromethane and chlorobenzene, which is suitable for the polymerization of olefin monomers. Any one thereof or a mixture of two or more thereof may be used. In addition, a small amount of water or air, which may act as a catalyst poison, may be removed by treating the solvent with a small amount of alkylaluminum in advance.

In addition, when a polymerization method such as continuous bulk polymerization is used, the metallocene supported catalyst may be used in the form of a mud catalyst by mixing with a mixture of oil and grease. In this case, the amount of a volatile organic compounds included in the olefin polymer to be prepared may be further reduced, as compared with the case where the catalyst is used after being dissolved or diluted in a solvent, and as a result, odor due to the volatile organic compound may also be reduced.

Meanwhile, the polymerization reaction for preparing an olefin polymer may be carried out by homopolymerization of a single olefin monomer or copolymerization of two or more types of monomers using one continuous slurry polymerization reactor, loop slurry reactor, gas phase reactor, or solution reactor. However, according to the method of one embodiment, it is more appropriate to polymerize the olefin monomers by slurry polymerization or gas phase polymerization in order to more effectively control the molecular weight distribution.

In addition, the method of preparing the olefin polymer may be carried out in a single-CSTR reactor.

The polymerization may be carried out in the polymerization reactor, for example, in the presence of an inert gas such as nitrogen. The inert gas may serve to maintain the reaction activity of the transition metal compound included in the catalyst for a long time by suppressing the rapid reaction of the catalyst at the beginning of the polymerization reaction.

In addition, during the polymerization reaction, hydrogen gas may be used for the purpose of controlling the molecular weight and molecular weight distribution of the olefin polymer. Hydrogen gas activates the catalyst's inactive site and causes a chain transfer reaction to control the molecular weight. When hydrogen gas is further introduced during the polymerization reaction, it may be introduced in an amount of 0.1 volume % or more, or 0.12 volume % or more, and 0.2 volume % or less, 0.18 volume % or less, with respect to the total volume of the olefin monomer, or in an amount of 10 ppm to 1000 ppm, more specifically, 10 ppm or more, or 30 ppm or more, or 40 ppm or more, and 1000 ppm or less, or 500 ppm or less, or 350 ppm or less, with respect to the total weight of the olefin monomer. When hydrogen gas is introduced in an amount within the above range, processability may be improved by reducing the molecular weight of the polymer to be prepared.

In addition, the polymerization reaction temperature may be 70° C. to 100° C., or 70° C. to 90° C. When the polymerization reaction temperature is too low, it is not appropriate in terms of polymerization rate and productivity. On the contrary, when the polymerization reaction temperature is higher than necessary, fouling in the reactor may be induced.

In addition, a pressure may be further controlled in order to secure optimal productivity during the polymerization reaction. Specifically, the pressure may be 7 $kg/cm^2$ to 9 $kg/cm^2$, more specifically, 7 $kg/cm^2$ or more, or 8 $kg/cm^2$ or more, and 9 $kg/cm^2$ or less, or 8.5 $kg/cm^2$ or less. The polymerization reaction pressure may be 7 $kg/cm^2$ or more in terms of preventing blocking due to excessive generation of high molecular weight and optimizing productivity, and may be 9 $kg/cm^2$ or less in consideration of suppression of side reactions under high-pressure polymerization conditions.

In addition, an organic solvent may be further used as a reaction medium or a diluent in the polymerization reaction. Such an organic solvent may be used in an amount such that slurry-phase polymerization may be appropriately performed in consideration of the content of the olefin monomer.

In addition, during the polymerization reaction, a trialkylaluminum such as triethylaluminum may be optionally further added.

When moisture or impurities are present in the polymerization reactor, a part of the catalyst decomposes. Since the trialkylaluminum acts as a scavenger which preliminarily captures moisture or impurities present in the reactor or moisture contained in the monomer, activity of the catalyst used in the preparation may be maximized, and as a result, an olefin polymer having excellent properties, particularly, a narrow molecular weight distribution may be more efficiently prepared. Specifically, alkyl in the trialkylaluminum is as defined above, and may be $C_{1-20}$ alkyl, more specifically, $C_{1-6}$ linear or branched alkyl, such as methyl, ethyl, isobutyl, etc.

Further, the trialkylaluminum may be introduced in an amount of 0.1 part by weight to 10 parts by weight, more specifically, 0.1 part by weight or more, or 0.3 parts by weight or more, and 10 parts by weight or less, or 5 parts by weight or less, or 1 part by weight or less, with respect to 100 parts by weight of the olefin monomer. An olefin polymer having excellent strength properties may be more easily prepared in the polymerization reaction in the presence of trialkylaluminum within the above-mentioned range.

The olefin monomer may be ethylene, alpha-olefin, cyclic olefin, diene olefin or triene olefin having two or more double bonds.

Specific examples of the olefin monomer may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenyl norbornene, vinyl norbornene, dicyclopentadiene, 1,4-butadiene, 1,5-pentadiene, 1,6-hexadiene, styrene, alpha-methylstyrene, divinylbenzene, 3-chloromethylstyrene, etc., and these monomers may be copolymerized by mixing two or more thereof.

In consideration of the use of the above-described metallocene supported catalyst, control and optimization of properties of the polymer, and the excellent effect of suppressing generation of fine powder, the olefin monomer may be specifically propylene in the preparation method according to one embodiment of the present invention.

The olefin polymer prepared by the above preparation method has fine powder having a particle size of 75 μm or less in a very low amount of 2% by weight or less, or 1.6% by weight or less, or 1% by weight or less, based on a total weight of the olefin polymer.

Accordingly, when molding and processing are performed using the olefin polymer, it is possible to prevent a problem of a reduction in the classifying efficiency due to adhesion of fine powder particles to a classifier by static electricity, or a problem of airborne fine powder in the work environment, etc.

Hereinafter, preferred exemplary embodiments are provided for better understanding of the present invention. However, the following exemplary embodiments are only for illustrating the present invention, and the content of the present invention is not limited to these exemplary embodiments.

Physical properties of the silica support and nanosilica used in the following Examples and Comparative Examples were measured by the following methods:

(1) BET specific surface area of silica support: measured through a nitrogen gas adsorption/desorption analysis at 77 K using a specific surface area analyzer, BELSORP-max (manufactured by BEL Japan Inc.) according to a BET method.

(2) Mean particle size (D50) of silica support: measured through a laser diffraction analysis. In detail, silica support powder was dispersed in ethanol as a dispersion medium, and then introduced into Microtrac 53500 manufactured by Microtrac. When silica support particles passed through a laser beam, a diffraction pattern difference according to the particle size was measured to obtain a particle size distribution, and a particle size at a point where a volume-based cumulative distribution of particles according to a particle size reached 50% in the analyzer was obtained and expressed as the mean particle size (D50) of the silica support.

(3) Mean pore size of silica support: measured by obtaining a nitrogen gas adsorption/desorption isotherm at 77 K using a specific surface area analyzer, BELSORP-max (BEL Japan Inc.), and then by plotting the isotherm according to BJH (Barrett-Joyner-Halenda).

(4) Mean particle size (D50) of nanosilica: measured through a laser diffraction analysis. In detail, the nanosilica particles were dispersed in ethanol as a dispersion medium, and then introduced into a laser diffraction particle size analyzer, for example, Zetasizer Nano ZS manufactured by Marvern, which is a laser diffraction particle size analyzer. When nanosilica particles passed through a laser beam, a diffraction pattern difference according to the particle size was measured to obtain a particle size distribution, and a particle size at a point where a number-based cumulative distribution of particles according to a particle size reached 50% in the analyzer was obtained and expressed as the mean particle size (D50).

<Preparation of Supported Catalyst>

Example 1-1

The inside of a double jacketed reactor was sufficiently purged with argon (Ar), and then 50 ml of toluene was introduced and the temperature was set to 30° C. 10 g of silica support was introduced into the reactor, and sufficiently stirred. At this time, a BET specific surface area of the silica support was 299 $m^2/g$, a mean particle size (D50) thereof was 37 μm, and a mean pore size thereof was 16.5 nm, and measurement methods thereof are as described above.

An MAO solution (10 mmol/g·$SiO_2$, solvent: toluene) at a concentration of 10% was slowly added thereto, followed by stirring at 90° C. for 15 hours. After cooling to room temperature, when settling occurred, the upper layer was decanted, and the residue was washed with 40 ml of toluene. The washing product was added to a solution, in which 0.7 g (90 μmol/g$SiO_2$) of diethylsilanediyl bis(2-methyl-4-(4'-tert-butylphenyl)indenyl)zirconium dichloride was dissolved in 14 ml of toluene, followed by stirring at 50° C. for 5 hours. The resulting reaction product was cooled to room temperature. When settling occurred, the upper layer was decanted, and the residue was washed twice with 40 ml of toluene, and then 40 ml of hexane was added thereto, followed by stirring. To the resulting reaction product, 0.5 g of nanosilica (mean particle size (D50): about 50 nm) diluted in 14 ml of hexane was added, and the mixture was stirred at room temperature for 30 minutes. When settling occurred, the upper layer was decanted and the residue was vacuum-dried to obtain 12.5 g of a metallocene supported catalyst.

(1-1)

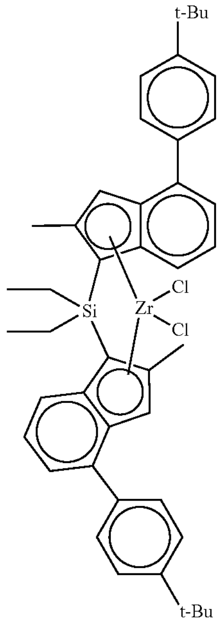

Examples 1-2 and 1-3

Each metallocene supported catalyst was prepared in the same manner as in Example 1-1, except that the reactants were used in combinations described in Table 1 below.

Example 1-4

A metallocene supported catalyst was prepared in the same manner as in Example 1-1, except that rac-[dimethylsilanediylbis(2-methyl-4-(1-naphthyl)indenyl)]zirconium dichloride (1-2) having the following structure was used instead of the transition metal compound (1-1) in Example 1-1.

(1-2)

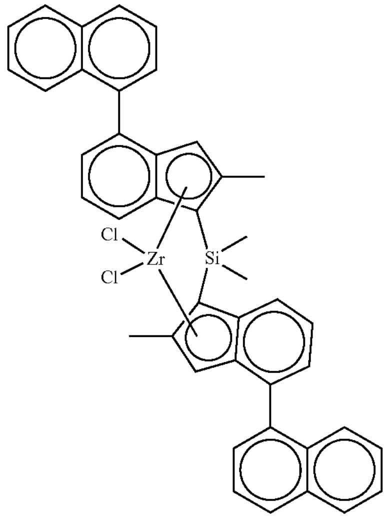

Comparative Examples 1-1 to 1-4

Each metallocene supported catalyst was prepared in the same manner as in Example 1-1, except that the reactants were used in combinations described in Table 1 below.

However, in Comparative Examples 1-3 and 1-4, Atmer™ 163, instead of nanosilica, was used as an antistatic agent in an amount described in Table 1 below.

Comparative Example 1-5

A metallocene supported catalyst was prepared in the same manner as in Example 1-1, except that nanosilica having a mean particle size (D50) of about 150 nm was used instead of the nanosilica during preparation of the metallocene supported catalyst in Example 1-1.

TABLE 1

| | MAO (mmol/g $SiO_2$) | Transition metal compound (μmol/g $SiO_2$) | Antistatic agent (parts by weight [a]) | Support (g) | Nanosilica (parts by weight [a]) | Mean particle size (D50) of nanosilica (nm) |
|---|---|---|---|---|---|---|
| Example 1-1 | 10 | 90 | 0 | silica (10) | 5 | 50 |
| Example 1-2 | 10 | 90 | 0 | silica (10) | 10 | 50 |
| Example 1-3 | 10 | 90 | 0 | silica (10) | 10 | 100 |
| Example 1-4 | 10 | 90[b] | 0 | silica (10) | 10 | 50 |
| Comparative Example 1-1 | 10 | 90 | 0 | silica (10) | 0 | — |
| Comparative Example 1-2 | 10 | 50 | 0 | silica (10) | 0 | — |
| Comparative Example 1-3 | 10 | 90 | 2 | silica (10) | 0 | — |

TABLE 1-continued

| | MAO (mmol/g $SiO_2$) | Transition metal compound (μmol/g $SiO_2$) | Antistatic agent (parts by weight [a]) | Support (g) | Nanosilica (parts by weight [a]) | Mean particle size (D50) of nanosilica (nm) |
|---|---|---|---|---|---|---|
| Comparative Example 1-4 | 10 | 90 | 10 | silica (10) | 0 | — |
| Comparative Example 1-5 | 10 | 90 | 0 | silica (10) | 10 | 150 |

In Table 1, the 'parts by weight' represents a relative weight ratio, based on 100 parts by weight of silica support; and the transition metal compound [b] used in Example 1-4 represents rac-[dimethylsilanediylbis(2-methyl-4-(1-naphthyl)indenyl)]zirconium dichloride.

<Preparation of Olefin Polymer>

Example 2-1

A 2 L stainless autoclave reactor was vacuum-dried at 70° C., and cooled, and 3 ml of triethylaluminum was introduced thereto at room temperature, and then 331 ppm of hydrogen and 770 g of propylene were sequentially introduced. After stirring for 10 minutes, 25 mg of the supported catalyst prepared in Example 1-1 was diluted in 20 ml of hexane and introduced into the reactor under Ar pressure. Thereafter, the temperature of the reactor was raised to 70° C., and polymerization was carried out for 1 hour. After completion of the reaction, unreacted propylene was vented, and a homopolypropylene was prepared.

Examples 2-2 to 2-4, and Comparative Examples 2-1 to 2-5

Each homopolypropylene was prepared in the same manner as in Example 2-1, except that the supported catalysts prepared in Examples 1-2 to 1-4, and Comparative Examples 1-1 to 1-5 were used respectively, instead of the supported catalyst prepared in Example 1-1, in Example 2-1.

Experimental Example 1

The supported catalysts prepared in Example 1-1 and Comparative Example 1-1 were observed by SEM, respectively, and the results are shown in FIGS. 1 and 2.

As shown in FIG. 1, the supported catalyst prepared in Example 1-1 showed that nano-sized silica existed on the surface of the silica support.

Meanwhile, as shown in FIG. 2, the supported catalyst prepared in Comparative Example 1-1 included open pores, and the catalyst material also existed on the surface of the support.

Experimental Example 2

Activities of the catalysts used in the preparation of the homopolypropylenes according to Examples and Comparative Examples and the contents of the fine powder in the prepared homopolypropylenes were measured, respectively, and shown in Table 2 below.

(1) Catalytic Activity

The catalytic activity was calculated as a ratio of the weight (kg PP) of the produced polymer (kg PE) per weight (g) of the supported catalyst used per unit time (hr).

(2) Content of Fine Powder

The contents of fine powder having a particle size of 75 μm or less included in the homopolypropylenes prepared in Examples and Comparative Examples were measured using a test sieve. From the obtained results, the content (% by weight) of fine powder of 75 μm or less, based on a total weight of homopolypropylene, was confirmed.

TABLE 2

| | Catalytic activity (gPP/mg Cat · hr) | Content of fine powder (% by weight) |
|---|---|---|
| Example 2-1 | 16.2 | 1.6 |
| Example 2-2 | 15.8 | <0.5 |
| Example 2-3 | 16.0 | 0.9 |
| Example 2-4 | 13.5 | <0.5 |
| Comparative Example 2-1 | 16.7 | 4.3 |
| Comparative Example 2-2 | 10.5 | 2.1 |
| Comparative Example 2-3 | 12.1 | 2.4 |
| Comparative Example 2-4 | 6.8 | 0.8 |
| Comparative Example 2-5 | 16.4 | 2.9 |

The results of Comparative Examples 2-1 and 2-2 confirmed that the catalytic activity increased as the content of the transition metal compound in the metallocene supported catalyst increased, but the generation of fine powder was also significantly increased. Further, to prevent this, when the antistatic agent was added as in the prior art, as seen from the results of Comparative Examples 2-3 and 2-4, the generation of fine powder was reduced, but at the same time, the catalytic activity was reduced. This tendency was intensified with the increasing amount of the antistatic agent.

In contrast, when nanosilica was introduced instead of the antistatic agent, generation of fine powder was greatly reduced even with a much smaller amount of nanosilica, as compared with the amount of antistatic agent used, and the decrease in the catalytic activity was also significantly reduced, as compared with the case of using the antistatic agent. Specifically, the metallocene supported catalyst used in Examples 2-1 to 2-4 showed a small decrease in the catalytic activity while having a large effect of reducing the generation of fine powder, as compared with Comparative Examples, particularly, Comparative Examples 2-3 and 2-4, in which the traditional antistatic agent was used.

In addition, as the content of nanosilica increased and the mean particle size of nanosilica decreased, the effect of reducing the generation of fine powder was increased. When the mean particle size of nanosilica was too large by deviating from the optimal range, the effect of reducing the generation of fine powder was greatly reduced. These results indicate that it is possible to significantly reduce the generation of fine powder while maintaining excellent catalytic activity by optimizing the mean particle size of nanosilica, and furthermore, the content thereof.

From these results, it can be seen that the metallocene supported catalyst according to the present invention may significantly reduce the generation of fine powder during preparation of polymers while exhibiting excellent catalyst activity.

What is claimed is:

1. A metallocene supported catalyst comprising:

a silica support comprising pores;

a transition metal compound supported on the silica support; and nanosilica disposed on a surface of the silica support and has a mean particle size of 10 nm to 100 nm, wherein the mean particle size of the nanosilica is determined by a particle size at a point where a number-based cumulative distribution of particles according to a particle size reaches 50% when a particle size distribution is measured by a laser diffraction analysis, wherein a mean pore size of the pores in the silica support is smaller than the mean particle size of the nanosilica, wherein the transition metal compound is represented by the following Chemical Formula 1:

[Chemical Formula 1]

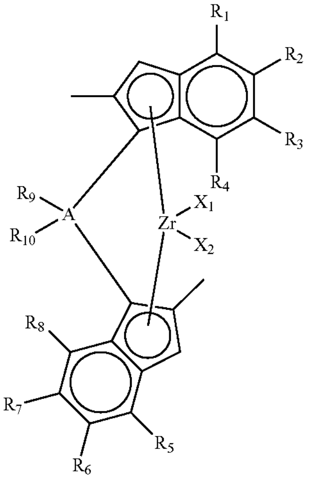

in Chemical Formula 1,

A is carbon, silicon, or germanium, $X_1$ and $X_2$ are each independently halogen, $R_1$ and $R_2$ are each independently $C_{6-20}$ aryl unsubstituted or substituted with $C_{1-20}$ alkyl, $R_2$ to $R_4$ and $R_6$ to $R_8$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl, and $R_9$ and $R_{10}$ are, the same as each other, $C_{1-20}$ alkyl.

2. The metallocene supported catalyst of claim 1, wherein the silica support has a mean particle size of 10 μm to 50 μm, the mean particle size of the silica support is determined by a particle size at a point where a volume-based cumulative distribution of particles according to a particle size reaches 50% when a particle size distribution is measured by the laser diffraction analysis, and has a Brunauer-Emmett-Teller (BET) specific surface area of 100 $m^2/g$ to 500 $m^2/g$, and the BET specific surface area of the silica support is measured through a nitrogen gas adsorption/desorption analysis at 77 K using a specific surface area analyzer according to a BET method.

3. The metallocene supported catalyst of claim 1, wherein the silica support has a mean pore size of 1 nm to 30 nm, and the mean pore size is measured by obtaining a nitrogen gas adsorption/desorption isotherm at 77 K using a specific surface area analyzer and then by plotting the isotherm according to Barrett-Joyner-Halenda (BJH).

4. The metallocene supported catalyst of claim 1, wherein the metallocene supported catalyst comprises the nanosilica in an amount of 1 part by weight to 10 parts by weight with respect to 100 parts by weight of the silica support.

5. The metallocene supported catalyst of claim 1, wherein A is silicon, $R_1$ and $R_5$ are each independently a phenyl or naphthyl group, wherein the phenyl or naphthyl group is optionally substituted with $C_{3-6}$ branched alkyl, and $R_9$ and $R_{10}$ are, the same as each other, $C_{1-4}$ linear alkyl.

6. The metallocene supported catalyst of claim 1, wherein the transition metal compound is any one of the following compounds:

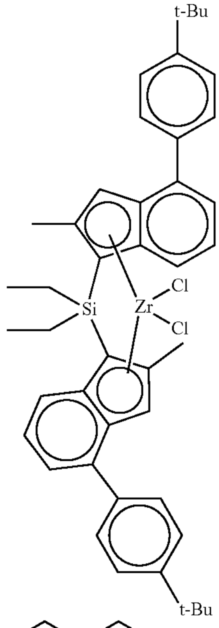

and

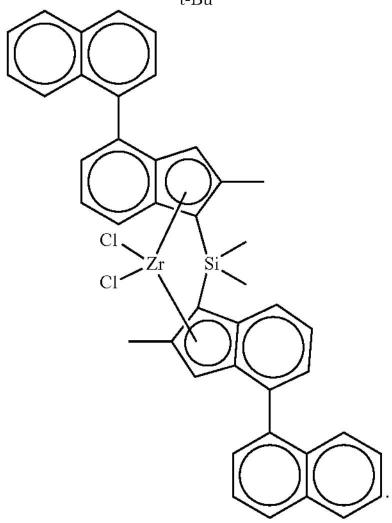

7. The metallocene supported catalyst of claim 1, further comprising one or more cocatalysts selected from the group consisting of compounds represented by the following Chemical Formula 2, Chemical Formula 3, and Chemical Formula 4:

$$—[Al(R_{11})—O]_m—$$ [Chemical Formula 2]

in Chemical Formula 2, a plurality of $R_{11}$ are the same as or different from each other, and each independently halogen; $C_{1-20}$ hydrocarbon; or $C_{1-20}$ hydrocarbon substituted with halogen; and m is an integer of 2 or more;

$$J(R_{12})_3$$ [Chemical Formula 3]

in Chemical Formula 3, a plurality of $R_{12}$ are the same as or different from each other, and each independently halogen; $C_{1-20}$ hydrocarbon; or $C_{1-20}$ hydrocarbon substituted with halogen; and J is aluminum or boron;

$$[E\text{-}H]^+[ZQ_4]^{31} \text{ or } [E]^+[ZQ_4]^-$$ [Checmical Formula 4]

in Chemical Formula 4,

E is a neutral or cationic Lewis base;

H is a hydrogen atom;

Z is a Group 13 element; and a plurality of Q are the same as or different from each other, and each independently a $C_{6-20}$ aryl group or a $C_{1-20}$alkyl group in which one or more hydrogen atoms are optionally substituted with halogen, $C_{1-20}$ hydrocarbon, alkoxy, or phenoxy.

8. The metallocene supported catalyst of claim 1, wherein the metallocene supported catalyst further comprises a $C_{1-20}$ alkylaluminoxane-based compound as a cocatalyst.

9. A method of preparing the metallocene supported catalyst of claim 1, comprising:

supporting the transition metal compound on the silica support; and adding the nanosilica to a transition metal compound-supported silica support, followed by mixing with each other to support the nanosilica on the silica support.

10. The method of claim 9, further comprising:

supporting a cocatalyst by adding the cocatalyst to the silica support, and then heating at a temperature of 70 to 100° C., before supporting the transition metal compound on the silica support.

11. A method of preparing an olefinic polymer, comprising polymerizing olefin monomers in presence of the metallocene supported catalyst of claim 1.

12. The method of claim 11, wherein the olefin monomers comprise propylene.

13. The method of claim 11, wherein the olefinic polymer comprises a fine powder having a particle size of 75 μm or less in an amount of 2% by weight or less, based on a total weight of the olefin polymer.

* * * * *